United States Patent [19]

Cooper

[11] Patent Number: 4,553,348

[45] Date of Patent: Nov. 19, 1985

[54] FISHING LURE

[76] Inventor: Raymond M. Cooper, 53 Hamilton St., Allendale, N.J. 07401

[21] Appl. No.: 585,507

[22] Filed: Mar. 2, 1984

[51] Int. Cl.⁴ .............................................. A01K 85/00
[52] U.S. Cl. ................................................ 43/42.06
[58] Field of Search ................ 43/41, 42.06, 44.8, 43/42.52, 44.83, 42.44; 220/22.2, 22.3; 206/82, 338, 339, 340, 345

[56] References Cited

U.S. PATENT DOCUMENTS

| | | | |
|---|---|---|---|
| D. 258,893 | 4/1981 | McCrae | D18/7 |
| D. 258,895 | 4/1981 | Kobayashi | D18/7 |
| 1,558,295 | 10/1925 | Sawyers | 43/44.83 |
| 1,744,366 | 1/1930 | Davenport | 43/42.44 |
| 1,993,990 | 3/1935 | Catarau | 43/42.06 |
| 2,740,224 | 4/1956 | Heiderich | 43/41 |
| 3,091,885 | 6/1963 | Ulsh | 43/42.52 |
| 3,449,852 | 6/1969 | Mitchell | 43/42.06 |
| 4,098,017 | 7/1978 | Hall | 43/42.39 |
| 4,205,476 | 6/1980 | Hsu | 43/42.06 |

FOREIGN PATENT DOCUMENTS 2055531 3/1981 United Kingdom ............... 43/42.06

Primary Examiner—Nicholas P. Godici
Assistant Examiner—M. Jordan
Attorney, Agent, or Firm—W. Patrick Quast

[57] ABSTRACT

A fishing lure having a container with a cavity for containing bait which can be seen and smelled by fish from the exterior thereof, the container having a sliding door which can be slid open for inserting the bait and having a swivel hook with an upper portion connected to the container and with a lower portion with a barbed leg for catching the fish and with a swivel connection for connecting the lower portion to the upper portion to prevent twisting thereof.

9 Claims, 7 Drawing Figures

U.S. Patent  Nov. 19, 1985  4,553,348
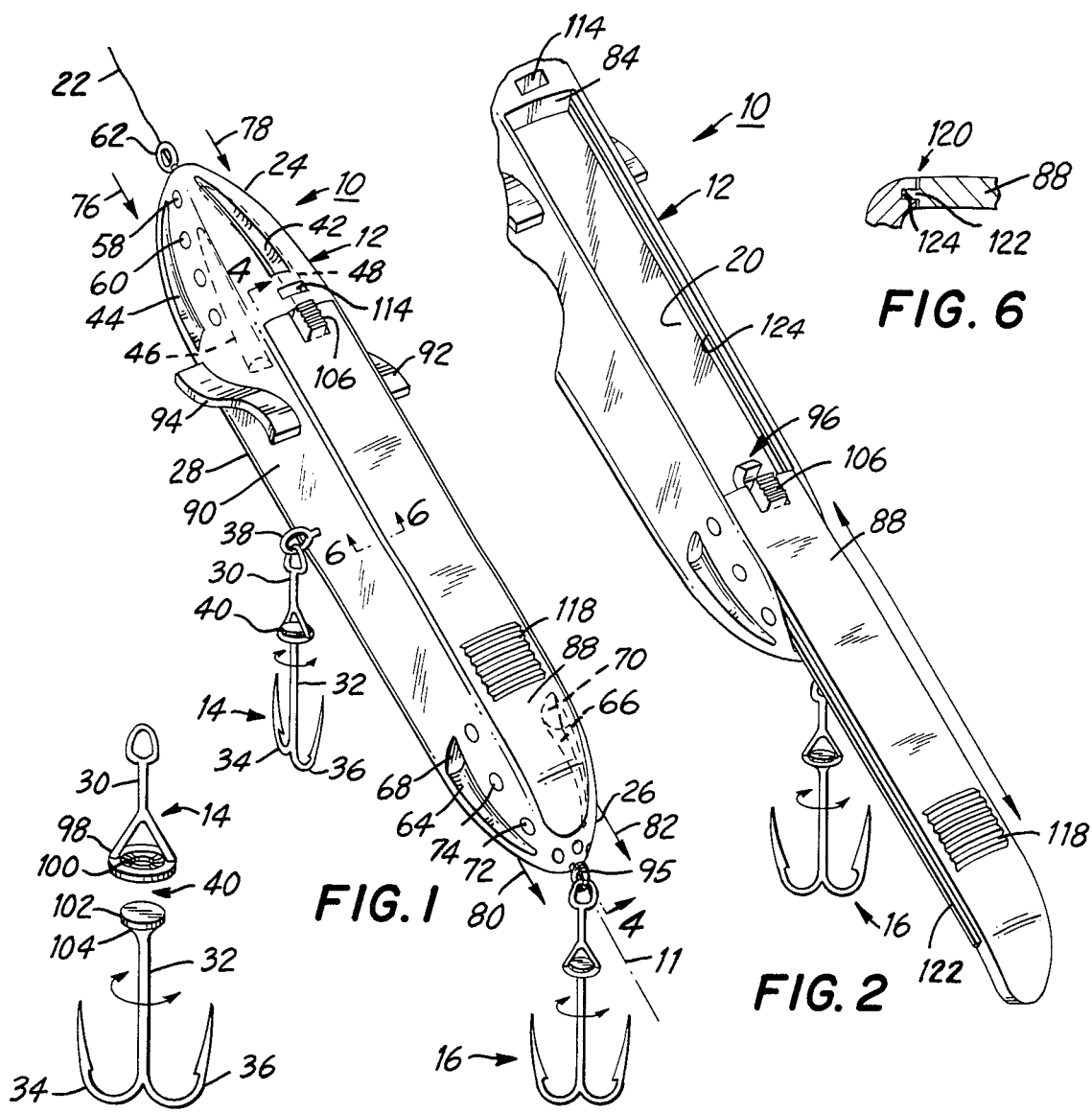
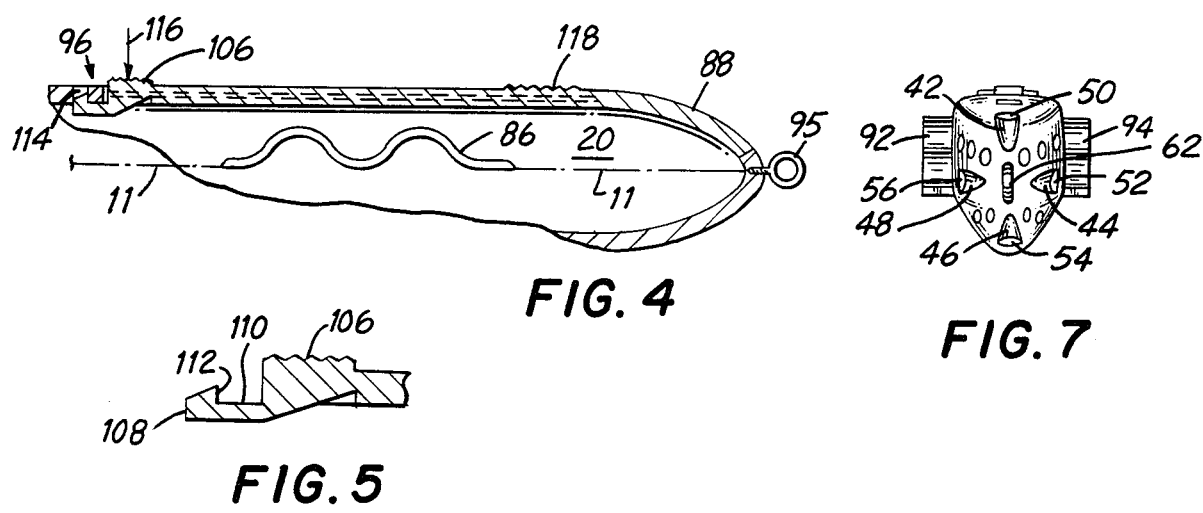

FISHING LURE

BACKGROUND OF THE INVENTION

The present invention relates to a fishing lure having a hollow container for bait and having a swivel hook mounted thereon. In particular, the invention relates to a fishing lure having a hollow container with a sliding door for inserting the bait, and having a swivel hook with an upper portion connecting to the container and a lower portion for catching the fish and with a frusto-conical swivel connection between the upper and lower portions.

The prior art fishing lure having a hollow container is shown in U.S. Pat. Nos. 4,047,317 and 2,467,971.

One problem with the prior art fishing lure is that it is difficult to insert the bait into the container. Another problem with the prior art fishing lure is that its hook sometimes acts to cause the loss of the lure, due to the twisting action of a hooked fish, or due to the catching of the hook on a rock, or the like.

SUMMARY OF THE INVENTION

The present invention has overcome the above named problems of the prior art fishing lure by using a container having an elongate sliding door, and by using a hook having an upper portion and a lower portion and a frusto-conical swivel connection therebetween.

The objects of the present invention are to provide a fishing lure wherein the fish can see and smell the bait, and then provide a fishing lure container wherein the bait can be easily inserted and locked therein, and to provide a container having a hook connected thereto wherein the hook does not act to cause loss of the fishing lure or fish.

These and other object of this invention will be more fully understood from the following description and drawings.

BRIEF DESCRIPTION OF THE DRAWINGS

FIG. 1 is a perpective view of a fishing lure according to the invention;

FIG. 2 is a perspective view of a portion of FIG. 1, showing a sliding door;

FIG. 3 is a perspective view of another portion of FIG. 1, showing a frusto-conical swivel hook;

FIG. 4 is a longitudinal section view, as taken along the line 4—4 of FIG. 1;

FIG. 5 is an enlarged detail of a portion of FIG. 4;

FIG. 6 is a section view as taken along the line 6—6 of FIG. 1; and

FIG. 7 is an end view of the leading end portion of the fishing lure.

DESCRIPTION OF THE PREFERRED EMBODIMENT

In FIG. 1, a fishing lure 10 according to the invention is shown. Lure 10, which has a longitudinal axis 11, includes a hollow container 12, and a plurality of swivel hooks 14, 16, 18. Hook 18 (not shown) is opposite to hook 14.

Container 12, which has a cavity 20, includes a leading end portion 24, which connects to a fishing line 22. Container 12 also has a trailing end portion 26 and has a center portion 28.

Hook 14, which is typically identical to hooks 16 and 18, includes an upper portion 30, which connects to container 12, and a lower portion 32, with a plurality of barbed extensions 34 and 36. Hook 14 also includes a swivel connection 40, which connects lower portion 32 to upper portion 30. Container 12 has an eyelet 38 which connects to portion 30. (Of course a similar eyelet would support hook 18).

Leading end portion 24 has a plurality of inlet recesses 42,44,46,48, which have respective recessed inlet holes 50, 52, 54, 56 for inflow of water; as shown in FIG. 7. Leading end portion 24 also has a plurality of flush inlet holes 58, 60 for additional inflow of water.

Leading end portion 24 also has an eyelet screw 62, which is fixedly mounted thereon, for connection to the fishing line 22.

Trailing end portion 26 also has a plurality of outlet recesses 64, 66 which have respective recessed outlet holes 68, 70 for outflow of water. Trailing end portion 26 also has a plurality of flush outlet holes 72, 74 for additional outflow of water from container 12. Water inflow direction is shown by arrows 76, 78 and water outflow is shown by arrows 80, 82.

Container 12 also has an opening 84. Cavity 20 extends inside leading end portion 24 and trailing end portion 26 and center portion 28, and which holds bait 86. Bait 86 may be a minnow, or a worm, or the like.

Opening 84 is covered by a sliding door 88, for inserting bait 86 into cavity 84. Center portion 28, which has an exterior surface 90, has a pair of wing fins 92, 94, removeably joined to said surface 90. Container 12 also has an eyelet 95 for supporting hook 16. The wing fins are shown having a curved surface and set at an angle from the longitudinal axis 11. This would result in the lure diving down and then having up down movement as the line is retrieved.

The fins can be pressed fit into the container or otherwise removeably engaged therewith. This will allow the use of different shaped fins for other desired movement. Further the container can exhibit different cooperative mounting means to allow for different angles of the fins relative to axis 11.

In FIG. 2, the sliding door 88 is shown in its open position. Door 88 and wing fins 92, 94 and leading end portion 24 and trailing end portion 26 and center portion 28 are composed of a transparent plastic material, so that bait 86 can be seen by a fish when in the water for attracting the fish, and can be seen by a fisherman.

Door 88 has a lock mechanism 96, as explained hereafter, and as shown in FIG. 5.

In FIG. 3, the swivel hook 14 is shown in greater detail, and is shown in a separated schematic view. Swivel connection 40 includes an upper part 98, which has an inner frusto-conical surface 100. Upper part 98 is fixedly joined to upper portion 30. Swivel connection 40 also includes a lower part 102, which has an outer frusto-conical surface 104. Outer surface 104 bears against inner surface 100 in the actual, assembled, non-separated assembly.

Lower part 102 can be designed to break, or fail, prior to upper part 98, and line 22, whereby the lure 10 will not be lost if the hook 14 is caught on a rock.

In FIG. 4, which is the longitudinal section as taken along line 4—4 of FIG. 1, the sliding door 88 is shown in its closed position. Lock 96 includes a ridged finger portion 106, which is formed on the topside of door 88 at the flexible center part thereof. Lock 96 includes a pointed end portion 108 having a groove 110 with an abutment 112. Center portion 28 has a rectangular hole 114 which is disposed adjacent lock 96 and which receives abutment 112 in the locked position.

For releasing lock 96, pressure is applied at the finger portion 106 in the direction of the arrow 116, thereby flexing the adjacent portion of door 88, and causing abutment 112 to move out of hole 114. Simultaneous frictional horizontal force applied to door 88 causes door 88 to slide to an open position.

In FIG. 5, lock 96 is shown in enlarged detail. Lock 96 is released by applying pressure at arrow 116. Abutment 112 then moves down and out from hole 114. Finger force applied to roughened surface portion 118 acts to slide door 88 away from opening 84. Bait 86 can be inserted into cavity 20. Door 88 is then slid to a closed position by applying an axial inwardly finger force at surface portion 118.

Bait 86 is then visible through the transparent container 12. Odor from bait 86 is carried by the water, which flows from inlet arrows 76, 78 to outlet arrows 80, 82, to the region of water in back of trailing end portion 26.

In FIG. 6, which is the sectional view as taken along the line 6—6 of FIG. 1, a tongue and groove sliding connection 120 of sliding door 88 is shown in greater detail. Door 88 has an elongate tongue portion 122. Center part 28, at its portion adjacent opening 84, has an elongate groove portion 124, which receives tongue portion 122. While only one longitudinal edge of door 88 is shown, it is understood that the opposite, other longitudinal edge of door 88 is identical thereto.

In FIG. 4, the tongue and groove connection 120 is shown as double dash lines, which are straight, elongate double dash lines, and which indicate the length of the connection.

In FIG. 7, which is an end view of container 12, the leading end portion 24 is shown in greater detail. The end views of recesses 42, 44, 46, 48 and their respective inlet holes 50, 52, 54, 56 are shown. A typical flush inlet hole 58 is also shown in FIG. 7.

In operation, lure 10 can be easily filled with bait 86, which can be locked in by lock 96, when door 88 is in its closed position. Container 12 can be held in one hand by the fisherman, while 88 is slid open and bait 86 inserted in cavity 20 with the other hand.

The lure 10 in the water is held above the floor of the stream or river by the action of a dynamic uplift force on the underside of wings 92, 94 which is caused by the flow of water parallel to the planes of the wings 92, 94.

The lure 10 is also held at an optimum angle, or position, by the flow of water along the planes of the wings 92, 94. While the lure 10 is vertically supported by the tension force of the line 22, wings 92, 94 act to prevent rotary motion of lure 10 which would cause twisting of line 22.

Rotary motion of hook lower portion 32, caused by a hooked fish, is not transmitted to hook upper portion 30 thereby avoiding twisting and breaking of the hook 14, or the entire lure 10.

Certain advantages of fishing lure 10 are indicated hereafter.

1. Container 12 can hold various types of bait 86, such as minnows, or worms, or other types of bait.
2. The invention provides a fishing lure wherein the fish can see and smell the bait; a fishing lure container wherein the bait can be easily inserted and locked therein; and a container having a hook connected thereto wherein the hood does not act to cause loss of the fishing lure or fish.
3. The torpedo contour of the lure optically magnifies the size, shape and movement of the line bait. This enhancement of the bait makes the lure that much more attractive to the predator fish.

Although only one embodiment 10 is shown in the drawings and explained in the specification, the scope of the invention is limited only by the following claims.

What is claimed is:

1. A fishing lure, for containing bait which can be seen and smelled by fish from the exterior thereof, comprising:
   a container having a leading end portion for connection to a fishing line and for inflow of water and having a trailing end portion for outflow of the water and having a cavity for holding the bait and having a center portion with a sliding door for inserting the bait into the cavity;
   said sliding door having a locking device, said locking device including a first end portion, said first end portion including a groove with an abutment, said center portion including a cooperating surface for coacting with said groove and abutment to retain said sliding door in a locked position, said first end portion including a flexible portion disposed adjacent said locking device, whereby a downward force on said flexible portion causes said abutment to move down and out from engagement with said cooperating surface for unlocking the door; and
   at least one swivel hook having an upper portion for connection to the container and having a lower portion with at least one barbed extension for catching a fish and having a swivel connection connecting the lower portion to the upper portion.

2. The fishing lure of claim 1, wherein the central portion has an exterior surface and has a pair of wings joined to said exterior surface for positioning the lure while in the water.

3. The fishing lure of claim 2 wherein the leading end portion and trailing end portion and central portion and sliding door and pair of wings are composed of a transparent plastic material.

4. The fishing lure of claim 3 wherein the container has a torpedo-like shape which optically enhances the appearance and movement of the bait within.

5. The fishing lure of claim 1 wherein the hook swivel connection comprises:
   an upper part having an inner frusto-conical surface, and a lower part having an outer frusto-conical surface, said outer surface being in bearing engagement with said inner surface.

6. The fishing lure of claim 5, wherein the swivel lower part has a breaking strength which is lower than the breaking strength of the swivel upper part so that the lower part breaks away when caught on an obstacle thereby saving the lure and the line.

7. The fishing lure of claim 1, wherein said sliding door has a roughened surface portion whereby a horizontal friction force applied along said surface can slide open said door from a closed, locked, position to an open, unlocked, position.

8. The fishing lure of claim 1, wherein said sliding door has a tongue and groove sliding connection disposed along each longitudinal edge thereof.

9. The fishing lure of claim 8 wherein each said tongue and groove connection comprises:
   an elongate tongue portion for supporting said door; and
   an elongate groove portion receiving said tongue portion and supported by said container center part.

* * * * *